(12) United States Patent
Hanna et al.

(10) Patent No.: US 11,988,379 B2
(45) Date of Patent: May 21, 2024

(54) BURNER FOR A COOKING APPLIANCE

(71) Applicants: BSH Home Appliances Corporation, Irvine, CA (US); BSH Hausgeräte GmbH, Munich (DE)

(72) Inventors: Charles Hanna, Knoxville, TN (US); Brian Silva, Knoxville, TN (US); Tyson White, Anderson, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 28 days.

(21) Appl. No.: 16/899,753

(22) Filed: Jun. 12, 2020

(65) Prior Publication Data
US 2021/0388980 A1    Dec. 16, 2021

(51) Int. Cl.
| | |
|---|---|
| *F23D 14/02* | (2006.01) |
| *F23D 14/04* | (2006.01) |
| *F23D 14/58* | (2006.01) |
| *F24C 3/08* | (2006.01) |
| *F24C 3/12* | (2006.01) |
| *F23D 14/30* | (2006.01) |

(52) U.S. Cl.
CPC ............. *F23D 14/02* (2013.01); *F24C 3/085* (2013.01); *F24C 3/124* (2013.01)

(58) Field of Classification Search
CPC ........... F23D 14/02; F24C 3/085; F24C 3/124
See application file for complete search history.

(56) References Cited

U.S. PATENT DOCUMENTS

| | | | | |
|---|---|---|---|---|
| 344,987 A | * | 7/1886 | Redmayne | F24C 3/027 |
| | | | | 126/40 |
| 1,589,993 A | * | 6/1926 | Siegler | F24C 3/087 |
| | | | | 239/543 |
| 2,560,777 A | | 7/1951 | Reeves | |
| 2,574,153 A | * | 11/1951 | Meiners | F23D 14/065 |
| | | | | 239/288.5 |
| 2,602,497 A | * | 7/1952 | Buhman | F23D 14/10 |
| | | | | 126/41 R |
| 3,437,416 A | | 4/1969 | Saponara | |

(Continued)

FOREIGN PATENT DOCUMENTS

| | | | | |
|---|---|---|---|---|
| DE | 102013102885 A1 | * | 9/2014 | ............. F23D 14/06 |
| FR | 732505 A | * | 9/1932 | |

(Continued)

*Primary Examiner* — Michael G Hoang
*Assistant Examiner* — Logan P Jones
(74) *Attorney, Agent, or Firm* — Michael E. Tschupp; Andre Pallapies; Brandon G. Braun

(57) ABSTRACT

Aspects and features of a burner for a cooking appliance include a first plate defining flame ports arranged in flow-sharing groups around a periphery of a combustion surface and a second plate coextensive with the first plate. Each plate is contoured so that the plates define an annular void within the burner. The annular void is fluidly coupled to the flame ports. In some aspects, each flow-sharing group includes clusters of flame ports, with each cluster including flame ports of two different diameters. The plates can each be made using the same tool such as a die, stamp, or mold, and the burner can be sized and installed in a cooking appliance so that it extends to cover a large portion of a wall of the cooking cavity of the appliance.

20 Claims, 7 Drawing Sheets

(56) References Cited

U.S. PATENT DOCUMENTS

| | | | | |
|---|---|---|---|---|
| 3,511,223 A | * | 5/1970 | Rhinehart | F24C 3/087 |
| | | | | 126/41 R |
| 3,625,196 A | * | 12/1971 | Craver | F24C 3/085 |
| | | | | 126/239 |
| 3,739,766 A | | 6/1973 | Helgeson | |
| 4,418,456 A | * | 12/1983 | Riehl | F23D 14/10 |
| | | | | 239/566 |
| 5,127,824 A | * | 7/1992 | Barker | A47J 37/0713 |
| | | | | 126/41 R |
| 5,344,312 A | * | 9/1994 | Polidero | F23D 14/105 |
| | | | | 431/326 |
| 5,359,989 A | * | 11/1994 | Chase | F24H 3/105 |
| | | | | 165/170 |
| 5,711,663 A | * | 1/1998 | Giebel | F23D 14/04 |
| | | | | 126/39 R |
| 6,461,149 B1 | | 10/2002 | Ahmady | |
| 6,564,795 B1 | * | 5/2003 | Sears | F24H 3/105 |
| | | | | 126/99 D |
| 6,619,279 B1 | * | 9/2003 | Liao | F24C 3/126 |
| | | | | 126/39 N |
| 8,662,069 B2 | | 3/2014 | Gasparini | |
| 9,134,033 B2 | * | 9/2015 | Nevarez | F23D 14/70 |
| 2003/0024525 A1 | * | 2/2003 | Jennings | F23D 14/045 |
| | | | | 126/39 R |
| 2003/0205223 A1 | * | 11/2003 | Schlosser | F23D 14/10 |
| | | | | 126/41 R |
| 2010/0263656 A1 | * | 10/2010 | Ryu | F24C 3/087 |
| | | | | 126/39 E |
| 2014/0026138 A1 | | 9/2014 | Bringe | |
| 2014/0290642 A1 | * | 10/2014 | Padgett | F24C 3/087 |
| | | | | 126/41 R |
| 2016/0040891 A1 | * | 2/2016 | Olivos Perez | F24C 3/085 |
| | | | | 126/39 E |

FOREIGN PATENT DOCUMENTS

| | | | | | |
|---|---|---|---|---|---|
| FR | 2665514 A1 | * | 2/1992 | | |
| GB | 598303 A | * | 2/1948 | | F24C 3/087 |
| GB | 1462985 A | * | 1/1977 | | F23D 14/58 |
| GB | 1579829 A | * | 11/1980 | | F23D 14/58 |

* cited by examiner

BURNER FOR A COOKING APPLIANCE

TECHNICAL FIELD

The present disclosure relates generally to cooking appliances and, more particularly (although not necessarily exclusively), to a blue-flame burner for providing heat to a cooking cavity in a cooking appliance.

BACKGROUND

Many cooking appliances include one or more burners in a cavity for cooking food or other items. Burners may be electrically powered or burn gas to generate heat. Gas burners may heat indirectly using a material that radiates energy into the cavity or may produce a blue flame that applies heat to the cooking area directly. It can be challenging to ensure the even distribution of heat to an item being cooked. Burners may result in part cooking at item at a different temperature than another part due to air flow, energy dissipation rates, and other factors. Manufacturers also work at the same time to reduce manufacturing complexity and cost.

Cooking appliances may include one or more different types of burners, positioned in different places. As one example, some cooking appliances include a cooking cavity with a burner at the top of the cooking cavity for broiling and a burner at the bottom of the cavity for baking Some cooking appliances include separate cavities for baking and broiling, with a single burner positioned between the two cavities. For broiling or baking, one appliance may include two smaller burners that are side by side with a space between the burners, while another appliance may include a single burner.

SUMMARY

A burner for a cooking appliance in some examples includes a first plate defining flame ports arranged in flow-sharing groups around a periphery of a combustion surface. The burner also includes a second plate coextensive with the first plate. Each plate is contoured to define an annular void within the burner. The annular void is fluidly coupled to the flame ports.

A cooking appliance in some aspects includes a housing defining a cooking cavity, and a burner in or on the housing sized and arranged so that at least one dimension of the burner is substantially coextensive with a wall of the cooking cavity. The burner in some examples includes a housing-facing portion and a cavity-facing portion. The cavity-facing portion defines flame ports arranged in flow-sharing groups around a periphery of a combustion surface. The cavity-facing portion, the housing-facing portion, or both can be contoured to define an annular void within the burner that is fluidly coupled to the flame ports.

A method of producing a burner for a cooking appliance in some aspects includes forming a first plate from sheet metal using a tool to include a contour roughly parallel to an edge of the first plate and forming a second plate from the sheet metal using the tool so that the second plate is identical to the first plate. In some examples, the method also includes forming flame ports in the first plate so that the flame ports arranged in flow-sharing groups around a periphery of the first plate. In some examples, one of the plates is rotated about an axis to mirror the other plate and the plates are coupled together to form an annular void in the burner with the flame ports fluidly coupled to the annular void.

BRIEF DESCRIPTION OF THE DRAWINGS

FIG. 3A is a side view, FIG. 3B is a cross-sectional side view, FIG. 3C is a perspective view, and FIG. 3D is a bottom view that includes a magnified view of part of the burner from a bottom view.

DETAILED DESCRIPTION

Certain aspects and examples of the present disclosure relate to a burner for a cooking appliance and that can provide a blue flame burner that is cost effective to manufacture and exhibits a high level of performance in evenness of heat distribution. A burner according to some examples can be manufactured using a single tool, such as a dye, mold, or stamp, to make both a top portion and a bottom portion of the burner from sheet metal. In some examples, flame ports are positioned around the periphery of the burner to reduce or eliminate hotspots. The size of the burner and the placement of the flame ports can create an even heat distribution throughout a cooking cavity.

In some examples, the burner includes a two-piece assembly made from sheet metal plates using one tool to form a contour in the plates. In such an example, the two plates can be identical when first formed by the tool. Once the plates have been formed, flame ports can be bored, drilled, or otherwise formed in the plate that includes the combustion surface of the burner. A difference between the two plates can be the presence of the flame ports in one of the plates, but not the other. In a broiling configuration, the flame ports can be on the bottom of the burner. In other examples, the burner can also be installed and used as a baking burner, in which case the flame ports and combustion surface can be on the top of the burner. The burner can be installed in any position, however.

The two portions of the burner can be coupled together along the edge and at one or more positions in the middle. In operation, the flame port area of the burner can be distributed towards the periphery of the cooking cavity. This layout can evenly distribute heat throughout the cavity and can avoid the hot spot experienced with other types of burners. Constructing a burner according to some examples from two identical parts can result in a burner with lower manufacturing cost than other burners, which can allow the burner to be made larger for a given cost. The burner can extend over a large area of a wall of the cooking cavity, which can aid in providing even heat distribution and avoid hotspots.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
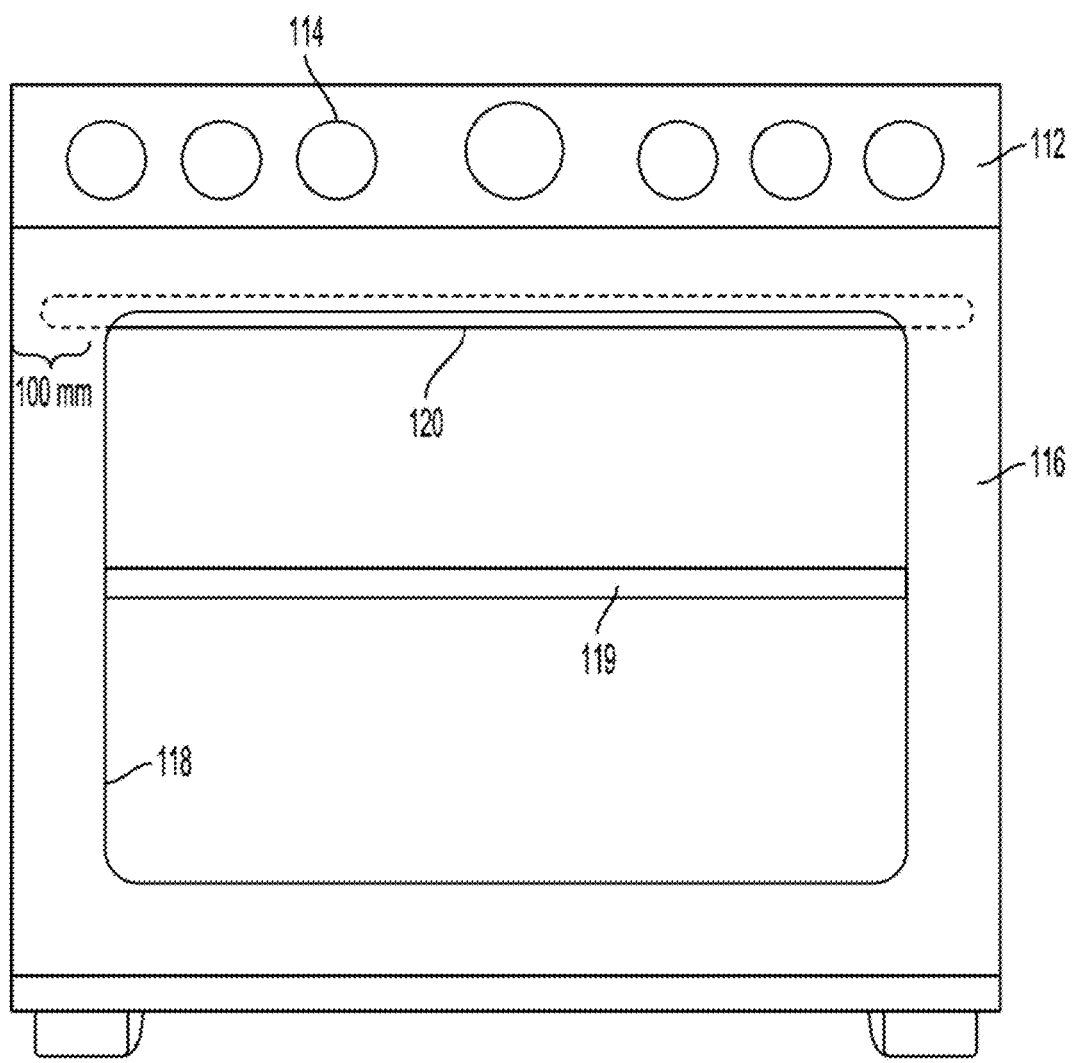
FIG. 1 is a front view of a household cooking appliance according to some aspects of the disclosure.

FIG. 1 shows a cooking appliance 100, illustrated without an oven door for clarity, according to one example of the present disclosure. The appliance 100 can include a housing 116 defining a cooking cavity 118. A control panel 112 can be provided with one or more control knobs 114 for controlling one or more cooking devices on the appliance. The cooking cavity 118 can include a burner 120 according to examples herein for cooking food that is placed inside the cooking cavity 118, for example on one or more shelves 119. Burner 120 may include any or all of the burner features described herein. The burner 120 can be positioned at the top of the cooking cavity 118 as shown. More particularly, the cooking cavity 118 includes a single, large broil burner 120 that is sized and arranged so that at least one dimension of the burner extends to within 100 mm of being coextensive with a top wall of the cooking cavity 118.

In the example shown in FIG. 1, burner 120 is configured as broil burner; however, a burner according to other aspects of this disclosure can be disposed at other locations, such as in a bottom of the cooking cavity to serve as a baking burner. The cooking cavity 118 also can include two burners wherein only one is a burner according to aspects of this disclosure and the other is a conventional burner of one type of another. FIG. 1 is a schematic illustration simplified for clarity. An appliance like appliance 100 and can include other components or elements not shown in FIG. 1, such as additional shelves or racks, shelf or rack supports, etc.

Figure 2:
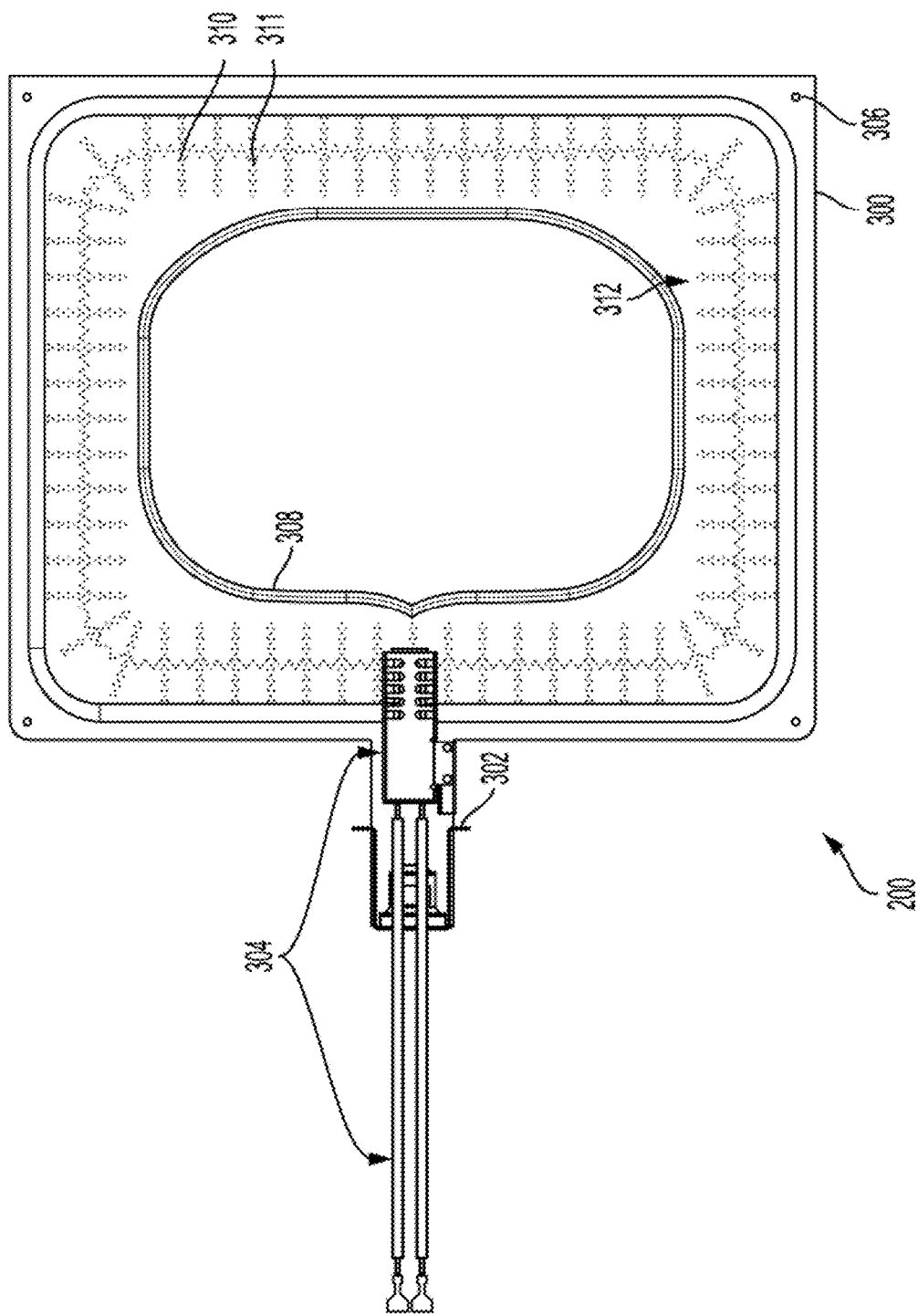
FIG. 2 is bottom view of a burner assembly according to some aspects of the disclosure.

FIG. 2 is bottom view of a burner assembly according to some aspects of the disclosure. Burner assembly 200 includes burner 300, retention mechanism 302, and igniter 304. The burner assembly 200 includes coupling mechanisms, such as screw holes 306, to couple the burner 300 into a cooking cavity. The bottom portion of burner 300 facing the viewer includes a contour 308 that, in conjunction with an identical contour in the opposing portion of the burner (not shown), can produce an annular void within the burner. Also observable in FIG. 2 are a number of flame ports 310 and 311. Others are visible as well. The flame ports are arranged in flow-sharing groups around a periphery of the combustion surface on the bottom surface of the burner. The flame ports are grouped for flow sharing, and to provide proper gas pressure, flow velocity, and flow magnitude. The combustion surface also includes flame ports that define an ignition path between the flow-sharing groups. The annular void of burner 200 can be fluidly coupled to the flame ports.

Burner 300 as shown in FIG. 2 can be installed in different orientations, for example, for broiling or baking Terms used herein such as "upper," "lower," "top," and "bottom," as well as "first" and "second," to refer to directions or structures, are intended as relative and are used for convenience and clarity in describing the examples depicted in the drawings.

Figure 3A:
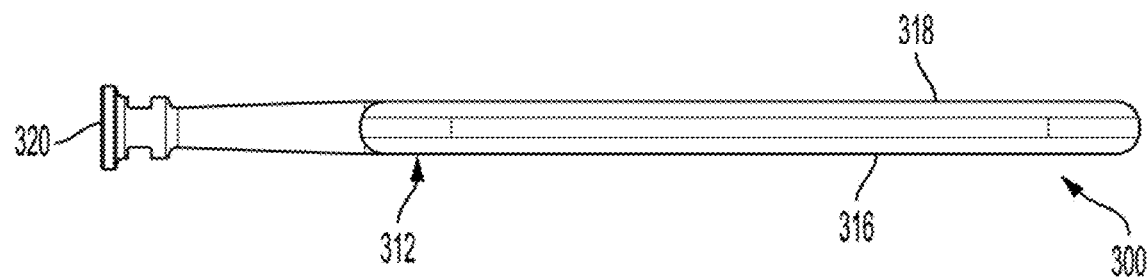
FIGS. 3A through 3D are various views of a burner according to at least some aspects of this disclosure.
Figure 3B:
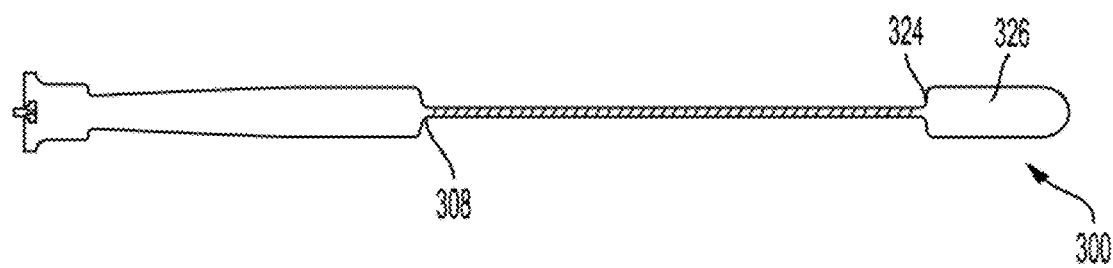
Figure 3C:
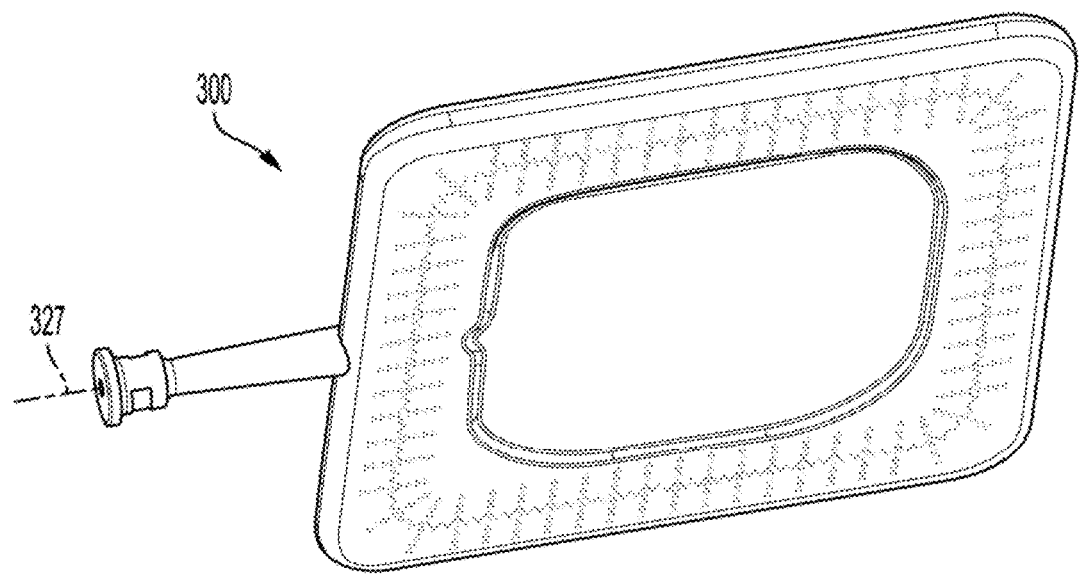
Figure 3D:
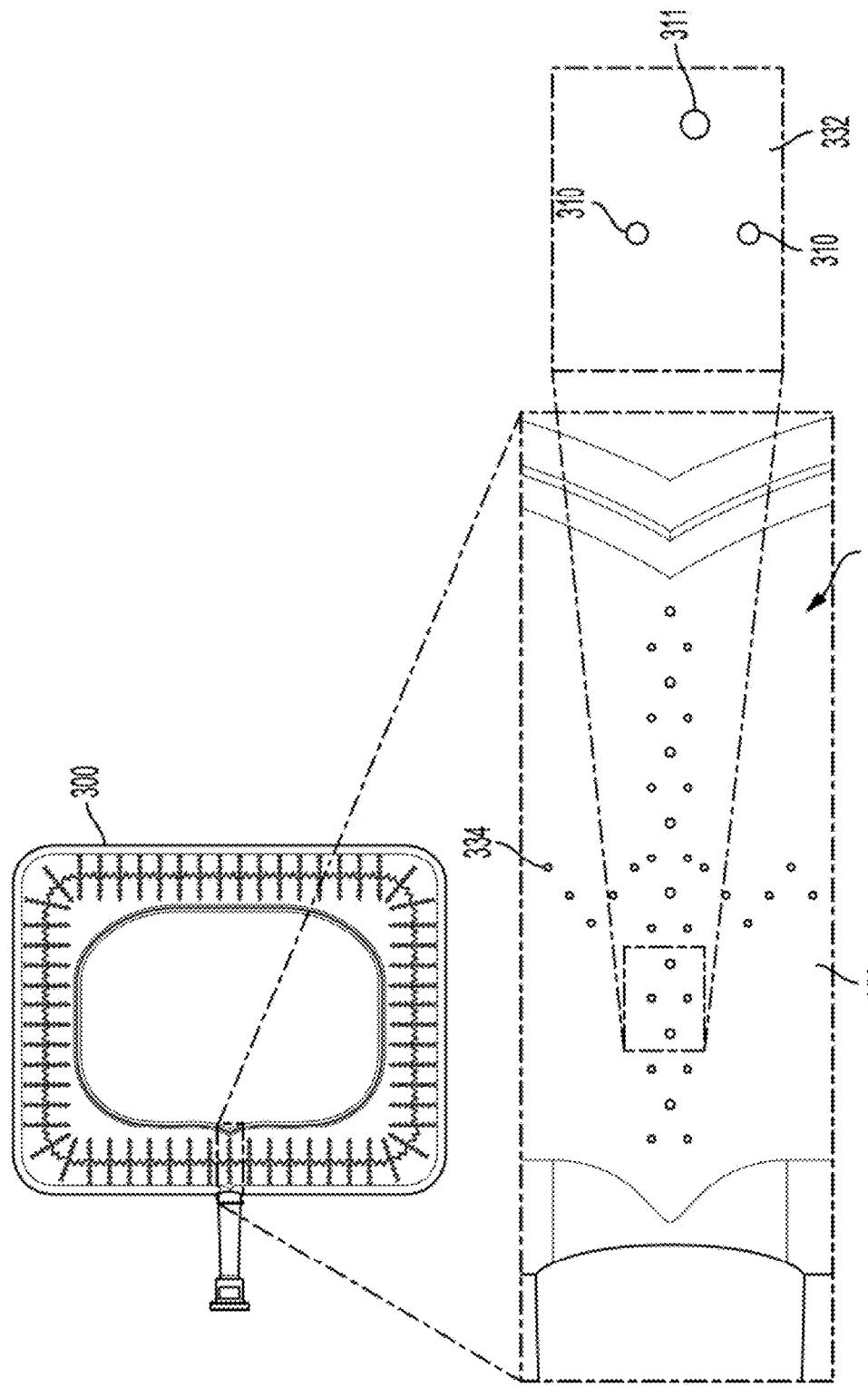

FIGS. 3A through 3D are various views of a burner according to at least some aspects of this disclosure. FIG. 3A is a side view, FIG. 3B is a cross-sectional side view, FIG. 3C is a perspective view, and FIG. 3D is a bottom view that includes magnified views to show detail. In FIG. 3A, the lower or first plate 316 and the upper or second plate 318 of the burner are visible. Also visible is Venturi tube 320. The Venturi tube 320 is roughly cylindrical in shape, and is constructed from semi-cylindrical extensions of the plates that make up burner 300. In FIG. 3B, contour 308 and opposing contour 324 are visible. Also visible is annular void 326. In operation, a mixture of air and gas can enter annular void 326 through Venturi tube 320. FIG. 3C is a perspective view illustrating the overall shape of burner 300. Although the contours that form the annular void 326 can be roughly parallel to the edges of the upper and lower plates that make up burner 300, the plates have been contoured so that the inner wall of the annular void is curved in a relatively gradual fashion to facilitate gas flow.

FIG. 3C shows the axis 327 about which the burner is symmetrical. Axis 327 is the cylindrical axis of Venturi tube 320 and extends to form an axis for the burner. Since the two plates that make up the burner can be identical except for the presence of the flame ports, each plate is also symmetrical about axis 327. During manufacturing, one of the plates can be rotated about axis 327 relative to the other plate. Rotating one plate relative to the other can result in one plate being a mirror image of the other so that the plates can be coupled together to create the burner with the appropriately shaped space inside to form the annular void 326.

FIG. 3D illustrates the flame port of burner 300 according to some aspects. FIG. 3D includes a first magnified portion 330 and the second magnified portion 332. Magnified portion 330 illustrates a flow-sharing group 331. Flow-sharing groups are distributed around the periphery of combustion surface 312. Magnified portion 332 illustrates a cluster of flame ports. Each flow-sharing group 331 includes repeating clusters. Also visible in magnified portion 330 are flame ports 334, which form an ignition path of flame ports that interconnects the flow-sharing groups. Flow-sharing group 331 in this example includes eight clusters distributed along a radial line across the outer portion of combustion surface 312 of burner 300. Each cluster and each flow-sharing group includes flame ports 310 of a first diameter and a flame port 311 of a second diameter. In this example, a cluster includes twice as many flame ports of the first diameter as of the second diameter. Within each cluster, the flame ports form a triangle pointing to the center of the burner with the flame port 310 of the second diameter forming the point of the triangle.

In the example of FIG. 3D, the second diameter is about twice the first diameter. More specifically, flame ports 310 are about 0.5 mm in diameter and flame ports 311 are about 1 mm in diameter. Ignition path flame ports 334 in this example are also about 0.5 mm in diameter. Various diameters and numbers of flame ports can be used in the flow-sharing groups, and the flame ports can be clustered in various ways or even not clustered by distributing the flame ports randomly within a group. Flame ports will typically be from 0.25 mm to 3 mm in diameter. Thus, as other examples, the two diameters of flame ports could be about 1 mm and about 2 mm, about 0.75 mm and about 1.5 mm, etc. Burners according to aspects described herein can vary in size, shape, and dimension. As an example, the burner pictured in FIG. 3 is typically sized to be 400-500 mm on a side, varying depending on the cooking cavity in which it is used. Descriptions of measurements herein using the term about are meant to convey a measurement that can vary based on typical tolerances of manufacturing, measurement, prototyping, tooling availability, tooling precision, and the like.

In FIG. 3, burner 300 has a total port loading of 256.69 $mm^2$ across 62 flow-sharing groups. This port loading specification includes the ignition path ports. The port loading of a flow-sharing group varies from 4.3 mm² to 8.6 mm² to distribute ports around corners and in groups that are more irregular in shape. Port loading can be changed as desired to maintain appropriate pressure and flow for the gas mixture in the burner, taking into consideration the dimensions of the burner and the range of heat desired for a given application. Spacing and grouping can be adjusted as needed. Design variations can include, as an example, port loadings per flame-sharing group of from 3 to 9 mm² with the number of flow-sharing groups varying between 50 and 70. In another example, port loadings per flame-sharing group can vary from 2 to 10 mm² with the number of flow-sharing groups varying between 40 and 80.

Figure 4:
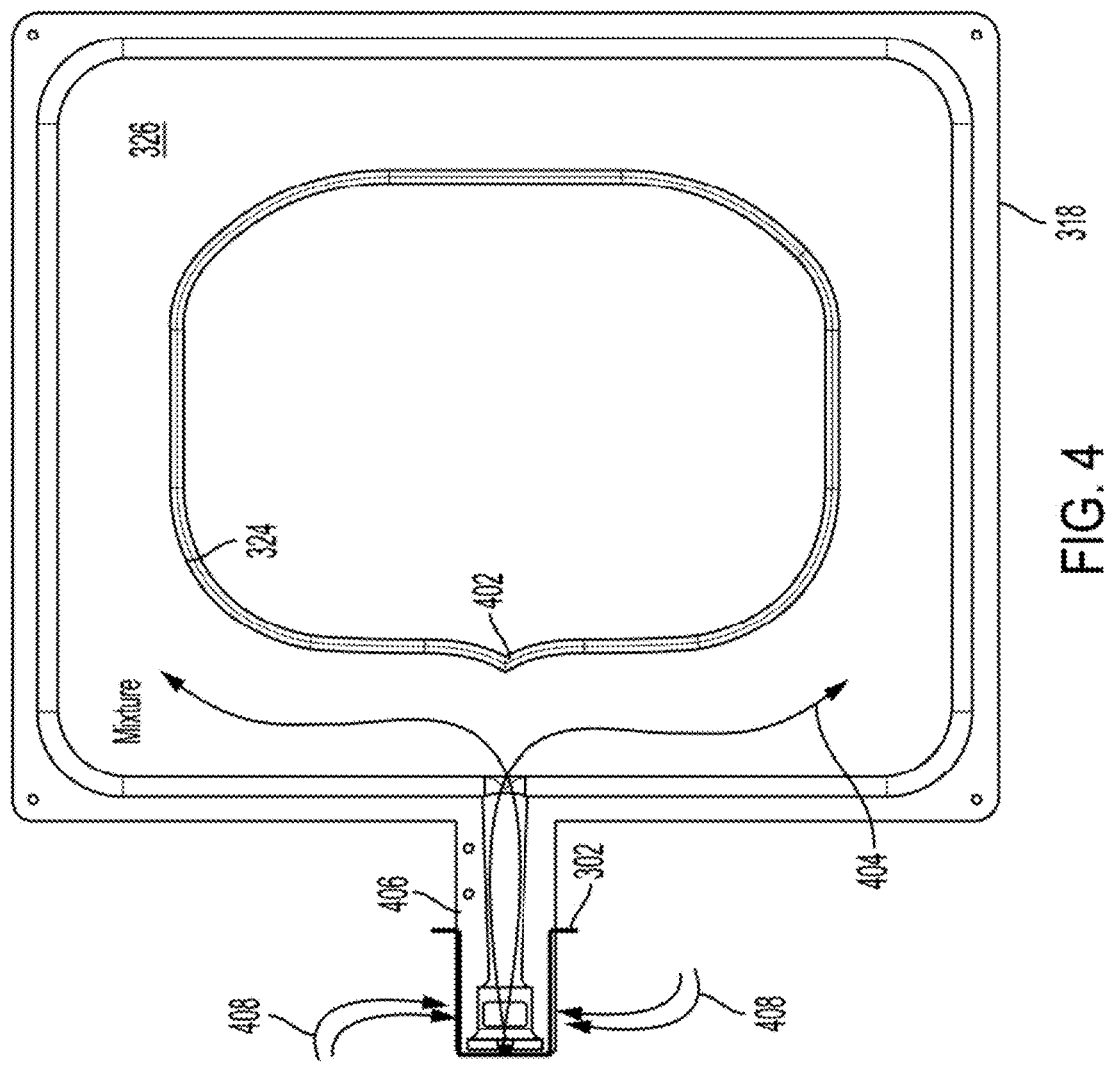
FIG. 4 is an inside view of a portion of a burner according to at least some aspects of this disclosure, including arrows illustrating gas flow and airflow when the burner is in operation.

FIG. 4 presents and inside view of upper plate 318, with contour 324, outside of which, the surface of plate 318 is raised. Contour 324 creates the upper portion of annular void 326. Contour 324 includes a contour point 402. Contour point 402, together with a similar point in the other plate, is proximate to the Venturi tube. This contour point causes the gas mixture 404 entering the annular void through the Venturi tube formed in part by semi-cylindrical extension 406 to divide more efficiently. During operation, gas mixture 404 flows in opposing directions around the annular void to fill the void. Gas mixture 404 can include gas entering the end of the Venturi tube and mixing with air 408 entering around the Venturi tube.

Figure 5A:
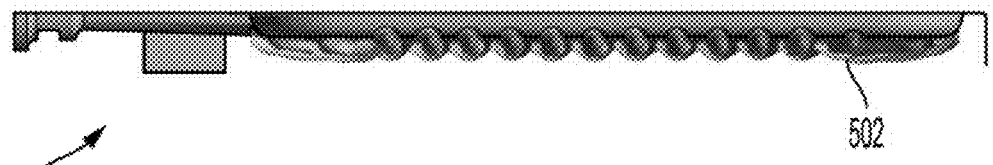
FIG. 5A and FIG. 5B are a bottom view and a side view, respectively, of a broil burner assembly in operation according to at least some aspects of this disclosure.
Figure 5B:
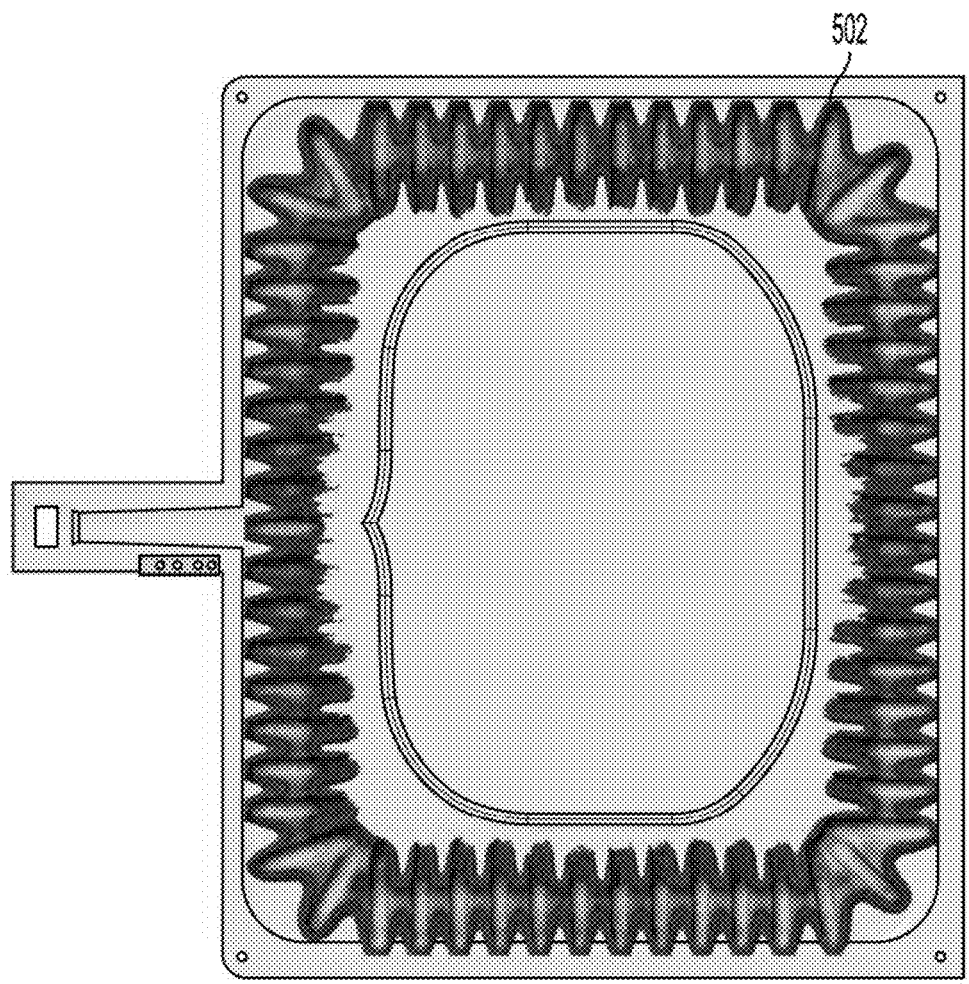

FIG. 5 illustrates the use of a burner assembly 500 according to some aspects described herein. Burner assembly 500 is illustrated in operation as a broiler burner. FIG. 5A is a side view in FIG. 5B is a bottom view. The flame ports (obscured by the flames) are arranged around the periphery of the combustion surface of the burner produce a flame pattern 502. This flame pattern, together with the coverage area of the burner, can provide even heating of the cooking cavity in the appliance.

Figure 6:
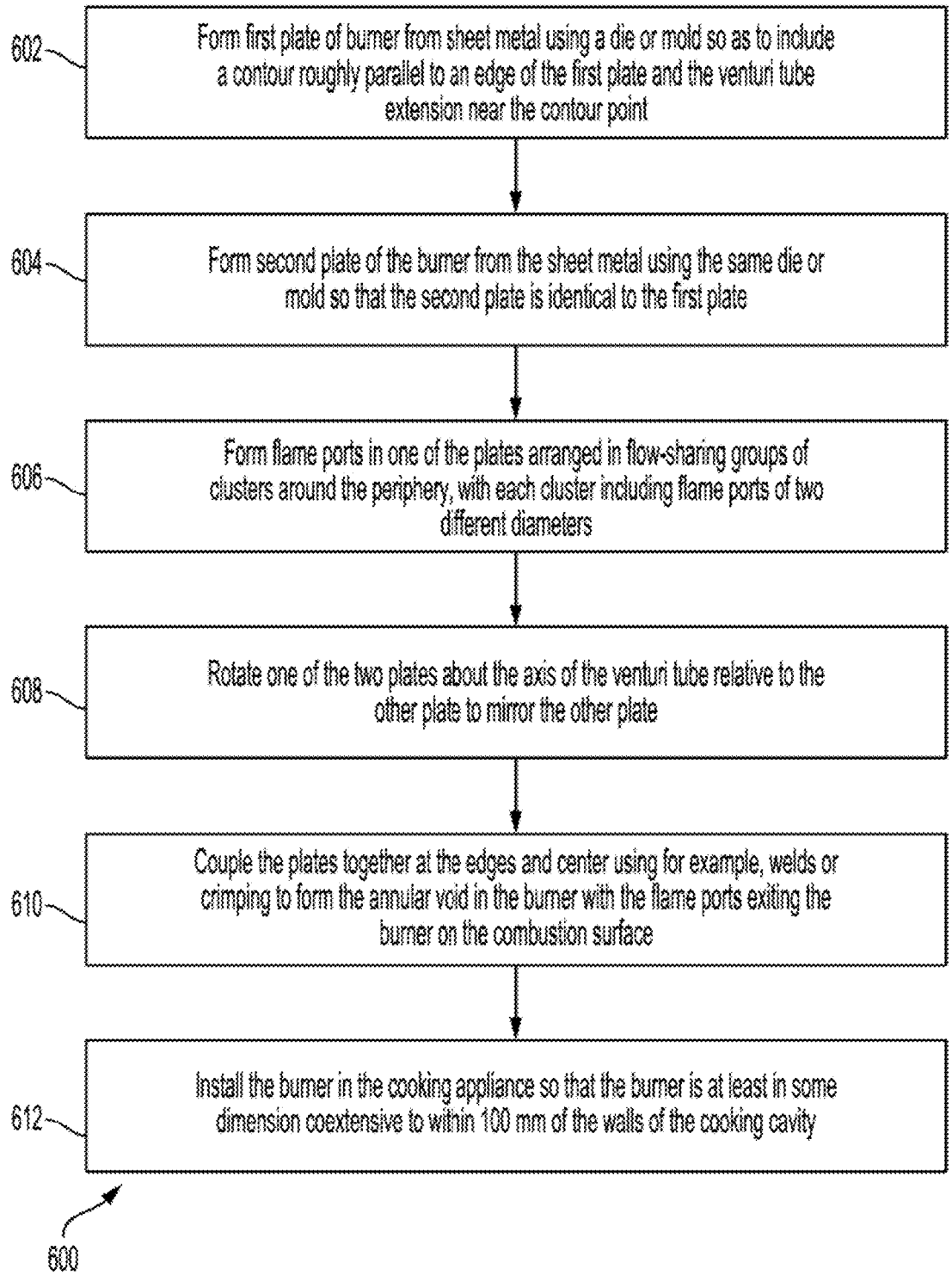
FIG. 6 is a flowchart of a process of producing a burner for a cooking appliance according to at least some aspects of the disclosure.

FIG. 6 illustrates a process 600 for producing a burner for a cooking appliance. At block 602, the first plate of the burner is formed from sheet-metal using a tool such as a die or mold so as to include a contour roughly parallel to an edge of the first plate. In this example, the first plate also includes a Venturi tube extension near a contour point. At block 604, the second plate of the burner is formed from sheet-metal using the same tool resulting in identical first and second plates. At block 606, flame ports are formed in one of the plates. The flame ports are arranged in flow sharing groups of clusters around the periphery, with each cluster including flame ports of two different diameters. The flame ports can be formed in various ways. For example, the flame ports can be cut with a laser, drilled, bored, or formed using a progressive die arrangement. At block 608, one of the two plates is rotated about the axis of the Venturi tube relative to the other plate. Rotating one of the plates causes one plate to mirror the other plate. At block 610, the plates are coupled together at the edges and in the center using any of various techniques. For example, the plates may be fastened by welding, crimping, joining with fasteners, etc. Once fastened, the plates form the annular void in the burner with the flame ports in fluid communication with the void, exiting the burner on the combustion surface. At block 612, the burner is installed in the cooking appliance, so that the burner is, in at least some dimension, coextensive to within 100 mm of a wall of the cooking cavity. As an example, for use as a broil burner, the burner would be coextensive with the top wall of the cooking cavity.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A burner for a cooking appliance, the burner comprising:
   a first continuous plate having a first unbroken, planar central expanse surrounded by a first outer portion, the first plate defining a plurality of flame ports arranged in a plurality of flow-sharing groups on a face of a peripheral combustion surface;
   a second continuous plate having a second unbroken, planar central expanse surrounded by a second outer portion, the second plate coextensive with the first plate, wherein respective outer edges of the first plate and the second plate are coupled to each other such that the respective central expanses face each other; and
   wherein the outer portions of the first plate and the second plate are contoured to define an annular void that is within the burner and that is fluidly coupled to the plurality of flame ports, and an overall thickness of the burner is greater at the outer portions than at the central expanses.

2. The burner of claim 1, wherein each flow-sharing group of the plurality of flow-sharing groups includes a plurality of clusters of flame ports distributed radially across the face of the peripheral combustion surface, each cluster of flame ports including at least one flame port of a first diameter and at least one flame port of a second diameter.

3. The burner of claim 2, wherein each cluster of flame ports includes twice as many flame ports of the first diameter as flame ports of the second diameter and wherein the second diameter is about twice the first diameter.

4. The burner of claim 1, wherein the first plate and the second plate each include a semi-cylindrical extension so that the semi-cylindrical extensions form a Venturi tube in fluid communication with the annular void.

5. The burner of claim 4, wherein the first plate and the second plate are symmetrical about an axis and mirror each other in opposing orientation to form the burner when one of the first plate or the second plate is rotated about the axis relative to another of the first plate or the second plate.

6. The burner of claim 5, wherein the first plate and the second plate each include a contour point proximate to the Venturi tube so that a gas mixture entering the annular void through the Venturi tube divides to flow in opposing directions around the annular void.

7. A cooking appliance comprising:
   a housing defining a cooking cavity; and
   a burner in or on the housing sized and arranged so that at least one dimension of the burner is substantially coextensive with a wall of the cooking cavity, the burner further comprising:
      a cavity-facing first plate defining a plurality of flame ports arranged in a plurality of flow-sharing groups on a face of a peripheral combustion surface; and
      a housing-facing second plate couple to the first plate along an outer perimeter, wherein at least one of the cavity-facing first plate or the housing-facing second plate is contoured to be concave to define an annular void within the burner fluidly coupled to the plurality of flame ports;
   wherein the first and second plates include respective unbroken, planar central expanses spanning an inner perimeter of the annular void; and wherein an overall thickness of the burner is greater at the annular void than at the central expanses.

8. The cooking appliance of claim 7, wherein each flow-sharing group of the plurality of flow-sharing groups includes a plurality of clusters of flame ports distributed radially across the face of the combustion surface, each cluster of flame ports including at least one flame port of a first diameter and at least one flame port of a second diameter.

9. The cooking appliance of claim 8, wherein each cluster of flame ports includes twice as many flame ports of the first diameter as flame ports of the second diameter, wherein the second diameter is about twice the first diameter, and wherein an ignition path of flame ports interconnects the flow-sharing groups.

10. The cooking appliance of claim 7, wherein the at least one dimension of the burner extends to within 100 mm of being coextensive with the wall of the cooking cavity.

11. The cooking appliance of claim 7, wherein the first plate and the second plate each including a semi-cylindrical extension so that the semi-cylindrical extensions form a Venturi tube in fluid communication with the annular void.

12. The cooking appliance of claim 11, wherein the first plate and the second plate are symmetrical about an axis of the Venturi tube and mirror each other in opposing orientation to form the burner when one of the first plate or the second plate is rotated about the axis relative to another of the first plate or the second plate.

13. The cooking appliance of claim 12, wherein the first plate and the second plate each include a contour point proximate to the Venturi tube so that a gas mixture entering the annular void through the Venturi tube divides to flow in opposing directions around the annular void.

14. A method of producing a burner for a cooking appliance, the method comprising:
  forming a first plate of the burner from sheet metal using a tool so as to include a first concave contour running parallel to an edge of the first plate, leaving a first unbroken, planar central expanse surrounded by the first concave contour;
  forming a second plate of the burner from the sheet metal using the tool so that the second plate includes a second unbroken, planar expanse surrounded by a second concave contour running parallel to an edge of the second plate;
  forming flame ports in the first plate of the burner, the flame ports arranged in a plurality of flow-sharing groups on a face of a peripheral combustion surface of the first plate;
  rotating one of the first plate or the second plate about an axis to mirror another of the first plate or the second plate; and
  coupling the first plate to the second plate along an outer perimeter to form an annular void in the burner such that the central expanses face each other and the flame ports are fluidly coupled to the annular void; and
  wherein an overall thickness of the burner is greater at the annular void than at the central expanses.

15. The method of claim 14, wherein the first plate and the second plate each comprise:
  an extension such that a Venturi tube is formed when the first plate and the second plate are fastened; and
  a point within the contour proximate to the extension so that a gas mixture entering the annular void through the Venturi tube divides to flow in opposing directions around the annular void.

16. The method of claim 14, wherein each flow-sharing group of the plurality of flow-sharing groups includes a plurality of clusters of flame ports distributed radially across the face of the combustion surface of the first plate, each cluster of flame ports including at least one flame port of a first diameter and at least one flame port of a second diameter.

17. The method of claim 16, wherein each cluster of flame ports includes twice as many flame ports of the first diameter as flame ports of the second diameter and wherein the second diameter is about twice the first diameter.

18. The method of claim 17, wherein each of the first diameter and the second diameter is between 0.5 mm and 3 mm.

19. The method of claim 14 further comprising installing the burner in the cooking appliance so that at least one dimension of the burner extends to within 100 mm of being coextensive with a wall of a cooking cavity in the cooking appliance.

20. The burner of claim 1, wherein the respective central expanses of the first and second plate are coupled together at a central point.

* * * * *